United States Patent
Lee

[19]

[11] Patent Number: 5,953,185
[45] Date of Patent: Sep. 14, 1999

[54] POLE BASE ASSEMBLY OF A VIDEO CASSETTE RECORDER

[75] Inventor: Chang-Ho Lee, Incheon, Rep. of Korea

[73] Assignee: Daewoo Electronics Co., Ltd., Rep. of Korea

[21] Appl. No.: 08/754,119

[22] Filed: Nov. 20, 1996

Related U.S. Application Data

[63] Continuation of application No. 07/360,531, Dec. 21, 1994, abandoned.

[30] Foreign Application Priority Data

Dec. 22, 1993 [KR] Rep. of Korea ............... 93-29086

[51] Int. Cl.$^6$ .................................................. G11B 15/61
[52] U.S. Cl. ...................................................... 360/130.23
[58] Field of Search ............... 360/85, 95, 130.2–130.23

[56] References Cited

U.S. PATENT DOCUMENTS 4,520,411  5/1985  Ohshima ........................... 360/130.23
5,296,994  3/1994  Katohno et al. ................... 360/130.21

FOREIGN PATENT DOCUMENTS 63-187449  8/1988  Japan ............... 360/130.21
1-53378    3/1989  Japan ............... 360/130.21
2-232851   9/1990  Japan ............... 360/130.21
4-258841   9/1992  Japan ............... 360/130.21
4-258842   9/1992  Japan ............... 360/130.21

Primary Examiner—Jefferson Evans
Attorney, Agent, or Firm—Anderson Kill & Olick

[57] ABSTRACT

A pole base assembly comprises a supporting bar, a guide cap having a lower planar portion for preventing a magnetic tape from upwardly diverging, a pole base having a protruding guide surface for preventing the magnetic tape from downwardly diverging and a through hole into which the supporting bar is closely fitted and a roller rotatably mounted around the supporting bar.

2 Claims, 2 Drawing Sheets

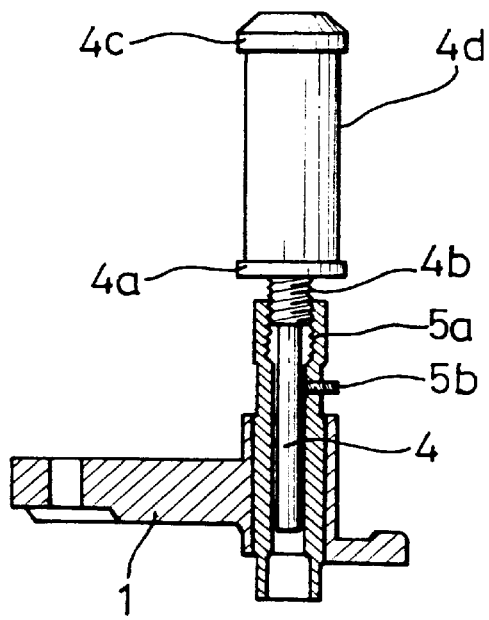
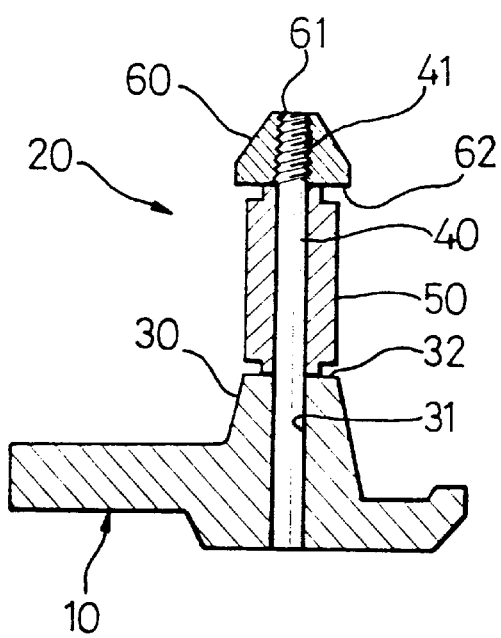

POLE BASE ASSEMBLY OF A VIDEO CASSETTE RECORDER

This is a continuation of U.S. application Ser. No. 07/360,531, filed Dec. 21, 1994, now abandoned.

FIELD OF THE INVENTION

The present invention is directed to a video cassette recorder; and, more particularly, to a pole base assembly of the video cassette recorder having an improved and simplified structure.

DESCRIPTION OF THE PRIOR ART

A video cassette recorder, usually referred to by its acronym "VCR", includes a pole base assembly movably mounted on a deck, for extracting a magnetic tape from a tape cassette and bringing the magnetic tape into a contact with a rotary head drum of the VCR. The pole base assembly includes a guide roller which guides a running magnetic tape to help maintain a proper vertical location of the tape with respect to the head drum.

In FIG. 1, there is shown a prior art pole base assembly having completed the loading of a tape drawn from a tape cassette (not shown) into a head drum 3. The pole base assembly is provided with a pole base 1, a guide roller 2 and a slant pole 1a. The guide roller 2 together with the slant pole 1a guides a running magnetic tape T so as to maintain a proper vertical location thereof with respect to the head drum FIG. 2 illustrates an exploded sectional view of the guide roller 2 secured on the pole base 1 in FIG. 1. As shown, the guide roller 2 comprises a cap 4c, a washer 4a and a screw member 4b into which a supporting bar 4 is closely fitted, and a roller 4d rotatably mounted around the supporting bar 4. The cap 4c and the washer 4a function as a guide-wall to restrict the vertical position of the tape within a proper range required for an accurate tracking operation of the head.

As best illustrated in FIG. 3, the guide roller 2 constructed as above is secured to the pole base 1 through the use of a screw member 4b and a nut 5a partially formed through the pole base 1. After the height of the guide roller 2 is adjusted to give the magnetic tape a proper vertical position with respect to the head drum, the supporting bar 4 of the guide roller 2 is fixed by a detent 5b.

While the prior art pole base assembly described above is capable of performing its assigned task, needs have continued to exist for an improved pole base assembly having a smaller number of components, which can be manufactured at a reduced cost. In the known pole base assembly, since the magnetic tape is substantially biased against the lower portion of the cap as it runs through the guide roller, the washer tends to be a superfluous thing. Further, employment of the threaded members in combining the guide roller with the pole base entails an increase in the manufacturing cost thereof.

SUMMARY OF THE INVENTION

It is, therefore, a primary object of the invention to provide a pole base assembly having a reduced number of components and a lower manufacturing cost.

The above and other objects of the invention are accomplished by providing a pole base assembly for use in a video cassette recorder, provided with a guide roller capable of guiding a magnetic tape, said assembly comprising: i) a supporting bar having a male screw at one side thereof; ii) a guide cap having a female screw corresponding to the male screw and a lower planar portion for preventing the magnetic tape from upwardly diverging; iii) a pole base having a protuberant guide surface for preventing the magnetic tape from downwardly diverging and a through hole into which the other side of the supporting bar is closely fitted; iv) and a roller rotatably mounted around the supporting bar between said guide cap and the protuberant guide surface, to thereby provide a rolling contact with the magnetic tape.

BRIEF DESCRIPTION OF THE DRAWINGS

The above and other objects and features of the instant invention will become apparent from the following description of preferred embodiments taken in conjunction with the accompanying drawings, in which:

FIG. 3 illustrates a partial sectional view of one of the pole base assemblies in FIG. 1; and FIG. 4 offers a sectional view of the inventive pole base assembly.

DETAILED DESCRIPTION OF THE PREFERRED EMBODIMENTS

Figure 1:
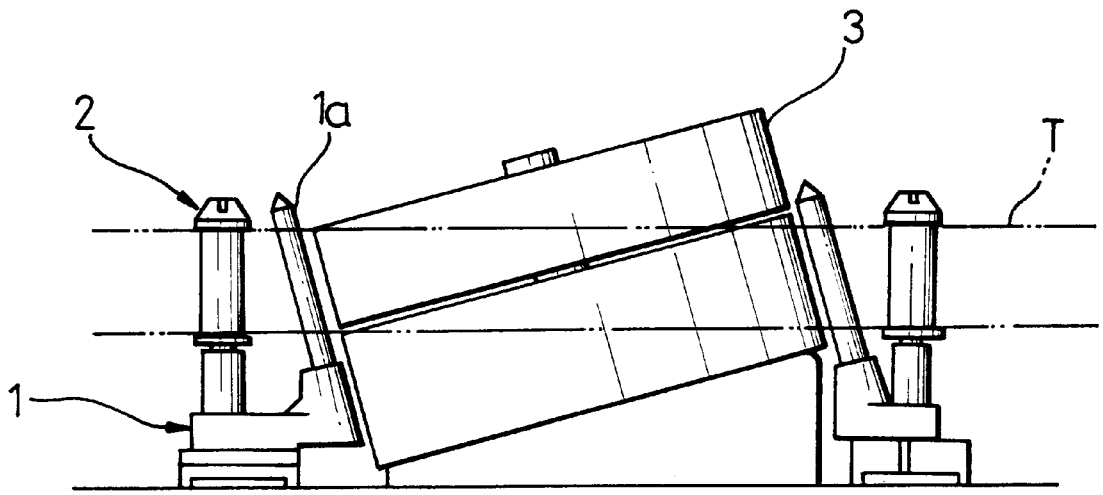
FIG. 1 shows a pair of prior art pole base assemblies positioned by a head drum assembly.
Figure 2:
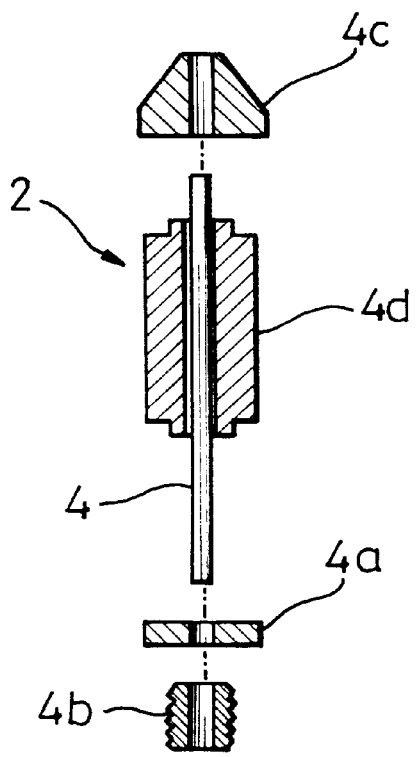
FIG. 2 represents an exploded sectional view of a guide roller for one of the pole base assemblies in FIG. 1.

Referring to FIG. 4, there is shown a pole base assembly in accordance with the present invention, which has a guide roller 20 installed in a pole base 10. As shown, the pole base 10 includes a through hole 31 and a protuberance 30 having an upper planar surface 32 which is designed to hinder an unwanted downward movement of a running magnetic tape (not shown).

A supporting bar 40 closely fitted into the through hole 31 of the pole base 10 has a male screw 41 which is to join with a corresponding female screw 61 formed through a cap 60. A lower planar portion 62 of the cap 60 functions as a guide wall for preventing the magnetic tape from upwardly diverging from its predetermined running path.

A roller 50 is pivotably mounted around the supporting bar 40 between the upper planar surface 32 and the lower planar portion 62. The roller 50 has a smaller diameter than that of the lower planar portion 62 of the cap 60 so as to permit the cap 60 to function as a guide wall.

Since the running magnetic tape is substantially biased against the lower planar portion 62 of the cap 60, vertical positioning of the tape becomes dependent on the height of the cap 60. During the manufacturing process of the pole base assembly, the cap 60 is adjusted to a preferable height for an accurate tracking action, and then may be fixed by using a locking-paint and the like.

Although the invention has been shown and described with respect to the preferred embodiments, it will be understood by those skilled in the art that various changes and modifications may be made without departing from the spirit and scope of the invention as defined in the following claims.

What is claimed is:

1. A pole base assembly for use in a video cassette recorder, said assembly comprising:

a supporting bar having a male screw at one side thereof;

a guide cap having a female screw corresponding to the male screw for adjusting a height of the guide cap and a lower planar portion for preventing a magnetic tape from upwardly diverging;

a pole base having a protuberant guide surface coming into a contact with a lower edge of a magnetic tape to thereby prevent a magnetic tape from downwardly diverging and a through hole into which the other side of the supporting bar is closely fitted, wherein said protuberant guide surface is the sole structure of the pole base assembly which acts to prevent downward divergence of a magnetic tape; and a roller and rotatably mounted around the supporting bar between said guide cap and the protuberant guide surface to thereby provide a rolling contact with a magnetic tape.

2. A video cassette recorder having a pole base assembly, wherein said assembly comprising:

a supporting bar having a male screw at one side thereof;

a guide cap having a female screw corresponding to the male screw for adjusting a height of the guide cap and a lower planar portion for preventing a magnetic tape from upwardly diverging;

a pole base having a protuberant guide surface coming into a contact with a lower edge of a magnetic tape to thereby prevent a magnetic tape from downwardly diverging and a through hole into which the other side of the supporting bar is closely fitted, wherein said protuberant guide surface is the sole structure of the pole base assembly which acts to prevent downward divergence of a magnetic tape; and a roller and rotatably mounted around the supporting bar between said guide cap and the protuberant guide surface to thereby provide a rolling contact with a magnetic tape.

* * * * *